Sept. 13, 1932. D. B. TOLLEY 1,877,084
POULTRY FOUNTAIN
Filed Oct. 10, 1929 2 Sheets-Sheet 1
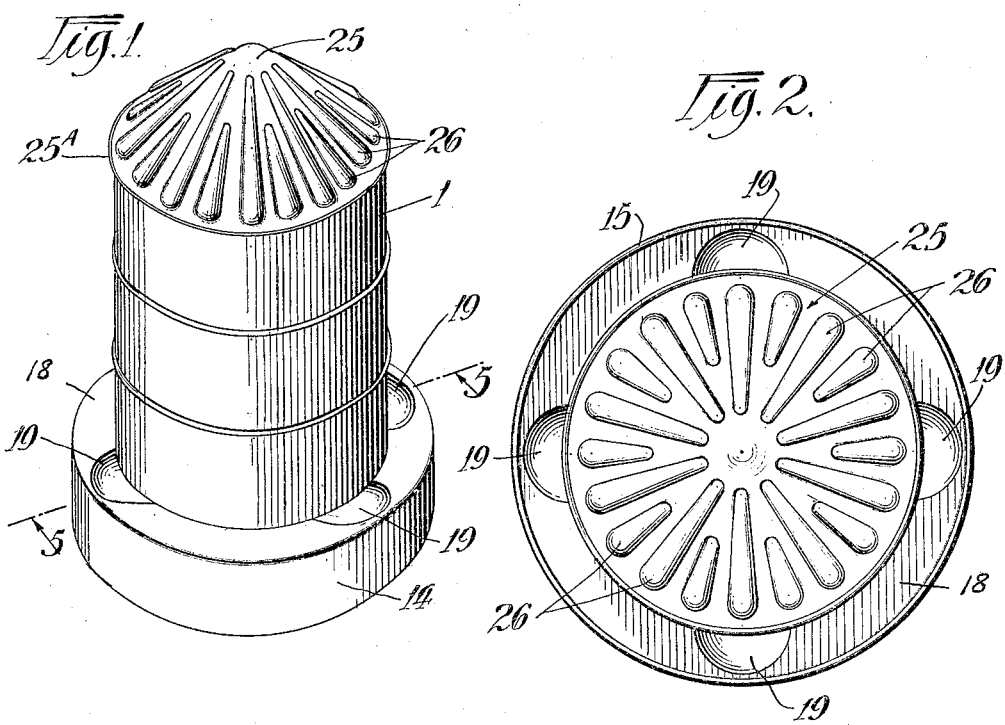
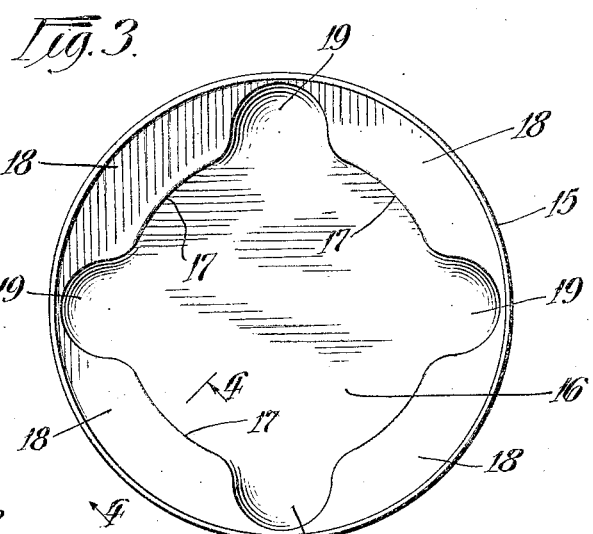
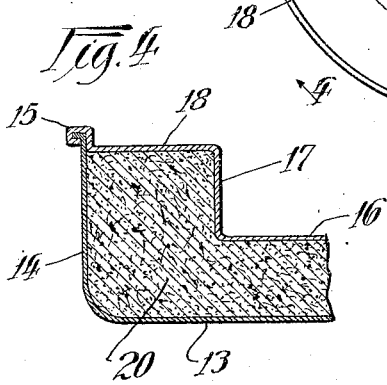
Inventor:
Donald B. Tolley
By Albert Scheible
Attorney.

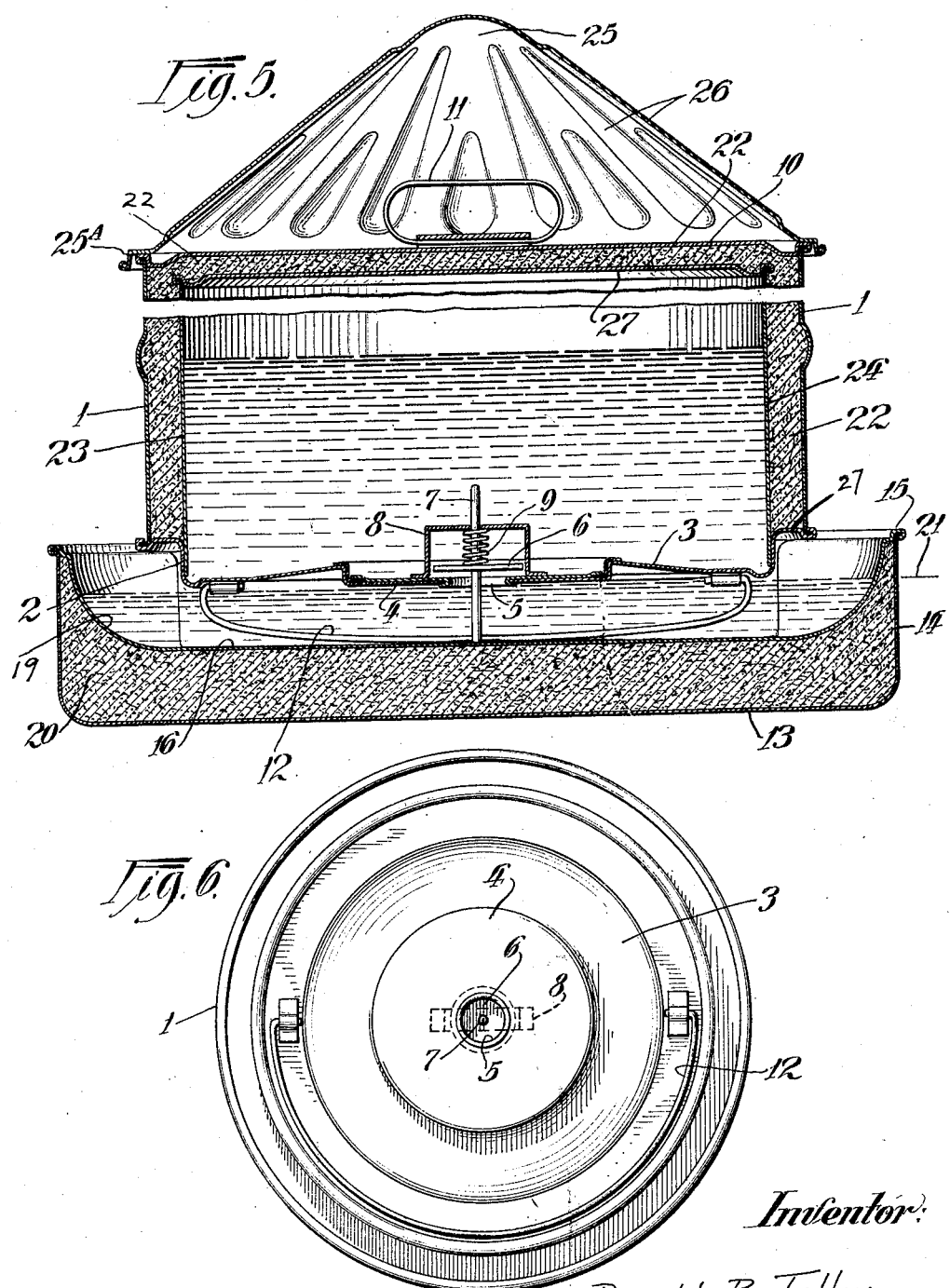

Patented Sept. 13, 1932

1,877,084

UNITED STATES PATENT OFFICE

DONALD B. TOLLEY, OF MACOMB, ILLINOIS, ASSIGNOR, BY MESNE ASSIGNMENTS, TO GLOBE AMERICAN CORPORATION, OF KOKOMO, INDIANA, A CORPORATION OF INDIANA

POULTRY FOUNTAIN

Application filed October 10, 1929. Serial No. 398,769.

My invention relates to thermally insulated poultry fountains and in its general object, aims to provide a fountain in which both the well and the liquid container are insulated with unusual effectiveness against a loss of heat from warm liquid; in which the container can be easily filled and carried, and can easily be placed in operative position without spilling any liquid, and in which chickens cannot roost upon the container.

Furthermore, my invention aims to provide a poultry fountain which will permit water to flow freely to the fonts or drinking cups without overflowing these cups, which will be sanitary and easily cleaned, and in which the water exposed in the cups is not likely to freeze even in quite cold weather.

More particularly, my invention aims to provide a poultry fountain in which the container has a portion centered in a well which has extensions affording spaced drinking fonts, in which these fonts as well as the main portion of the well are effectively insulated against heat losses so that only the exposed surface portions of the water in the fonts is subject to direct heat losses; in which the container can easily be carried with either side up, and in which the filled can be set into its operative positions without the spilling of any liquid and without a splashing of liquid out of the fonts.

Moreover, my invention provides a poultry fountain in which a spring-pressed valve prevents a spilling of the water while the container is being placed upon the well, and in which this valve is mounted on a relatively large end cap which can readily be detached to facilitate the filling of the container and to permit an easy cleaning of the interior of the container.

Still further and also more detailed objects will appear from the following specifications and from the accompanying drawings, in which Fig. 1 is a perspective view of a poultry fountain embodying my invention.

Fig. 2 is a plan view of the same, drawn on a larger scale.

Fig. 3 is a plan view of the base portion alone, drawn on the same scale as Fig. 2.

Fig. 4 is a fragmentary and enlarged vertical section through the base portion of the fountain, taken along the line 4—4 of Fig. 3.

Fig. 5 is a fragmentary and enlarged central and vertical section through the erected fountain, taken along the line 5—5 of Fig. 1.

Fig. 6 is a bottom view of the receptacle, drawn on the same scale as Fig. 5.

In the illustrated embodiment, my poultry fountain includes a receptacle or water container having a generally cylindrical outer wall portion 1 and a short neck portion 2 of smaller diameter than the said main portion. This neck portion is adjacent to the container end 3 which faces downward when the container is in its operative position, namely in the position shown in Figs. 1 and 5, and is connected at its lower end to the outer wall 1 by a substantially horizontal annular shoulder 27.

The container end 3 has a central opening, which desirably is considerably larger in diameter than a man's hand, and which opening is closed by a detachable cap member including a cap end 4 having a central aperture 5 in alinement with a valve member 6 of larger diameter than the aperture 5.

This valve member 6 is fast upon a valve stem 7 which extends slidably through a stirrup 8 fastened to the cap end 4, and a compression spring 9 interposed between the stirrup and the valve member 6 continuously urges the latter downwardly toward the cap end, or toward a position in which this valve member closes the aperture 5.

The other and normally upper end 10 of the container is flat, and handles 11 and 12 are respectively pivoted to the two ends of the container so that the latter can conveniently be carried either in its operative position of Fig. 5, or in a relatively inverted position in which the generally flat end 10 of the container will seat on a floor.

The base portion of my fountain includes a shallow cup-shaped part affording a flat bottom 13 and a cylindrical peripheral riser wall 14, and a more shallow well-forming member which has its edge portion 15 seated upon and secured to the upper edge of the said wall 14. This well-forming member includes a horizontal bottom 16, a plurality of spaced and arcuate riser wall portions 17, a corresponding number of upper horizontal shoulders 18, and a similar number of font portions 19 each interposed between two consecutive riser wall portions. Each of these font portions is here shown as substantially quarter-spherical, the upper metal member of the base portion of my fountain being formed to afford a shallow cup-shaped well into which the said font portions open.

Each font portion 19 is desirably formed as the surface of a quarter of a sphere and extends tangential to the bottom 16 which bottom is spaced by a considerable distance upwardly from the bottom 13 of the base member; while the depth of the well of which the part 16 forms the bottom is considerably greater than the length of the neck 2 of the container.

The inward riser wall portions 17 of the base member have their inner faces disposed as parts of a cylindrical surface coaxial with the peripheral wall 14, and the said cylindrical surface has a diameter slightly larger than the outside diameter of the container neck 2, so that this neck will socket between the wall portions 17 when the container is set down (as in Fig. 5) with one end of its outer wall 1 seated on the flat well top portions 18, thereby centering the container on the base member. Moreover, the outer container wall 1 is only of slightly greater diameter than the said common bore of the inner well walls 17, so that the container when thus seated, freely exposes the major portions of the drinking fonts 19, as shown in Fig. 2. Also, the length of the valve stem 7 is such that when the container is thus seated on the base member, the lower end of the valve stem engages the well bottom 16 and is lifted against the resistance of the spring 9, thereby raising the valve member 6 and opening the aperture 5 so that water from the container will flow into the well.

To prevent my poultry fountain from freezing, I provide the following heat-insulations: First, I pack the space between the cup-shaped base bottom member 13 and the well-forming base top member with heat insulating material 20 which extends between the parts 13 and 16, and which also extends between the peripheral base wall 14 and all of the well wall portions 17 and 19. This heat insulation 20 insulates the water in the well and its fonts both from the bottom and also peripherally, so that the only portions of the water exposed directly to outside temperatures are the top surface portions in the fonts.

Since the water will flow into the well only to the level 21 of the lower end of the container aperture 5, only small surfaces of water are thus exposed to the outer air. As soon as any of these small surface portions chill, the cooled water moves downward and is replaced by relatively warmer water from the well. Consequently, the water cannot freeze in the fonts until all of the water in the well falls to a freezing temperature, so that convection currents in the water (or other liquid) cooperate with the construction of my fountain in preventing a freezing under ordinary operative conditions.

To insulate the water in the container, I provide a heat-insulating filling 22 between outer portions of the container and an inner water-holding receptacle, which receptacle consists of a tubular wall 23 secured to the neck 2 and a receptacle end 24 spaced from the container end 10. Hence the liquid in my fountain is completely insulated against heat losses, except at the surfaces exposed in the font portions or well extensions, which hold only a very small portion of the total liquid capacity of my fountain.

Furthermore, I desirably provide a detachable cover 25 having a flanged peripheral portion 26 fitting over the outer edge of the container end 10, this cover being preferably of a generally conical shape provided with radial grooves 26 which cooperate with the conical shape of the cover in preventing chickens from roosting upon and soiling the cover. When the cover is slipped over the upper container end, as in Fig. 5, the air within this cover serves also as an additional heat insulation, so that the thickness of the heat insulation 22 between the upper container end walls 10 and 26 can be relatively small.

With a thus constructed poultry fountain, the empty container can readily be carried with its cap end upwards, by means of the handle 12, which handle normally depends into the well and is swung out of the way of the valve stem 7 by the engagement of the handle with the bottom 16 of the well. When the container is disposed with its neck and valve end upwards, it can quickly be cleaned and refilled after the cap 4 is detached; and when the cap is replaced, the spring-pressed valve seals the container. When the filled container is then inverted and held from the other handle 11, it can readily be positioned on the well, thereby causing the valve to open automatically after this valve has prevented any spilling of the water during the carrying of the freshly filled container.

The particular construction employed for valve and its mounting forms no part of my present invention, hence I am not here describing it in detail.

By providing well fonts (or well-depression extensions) which expose only a quite small amount of water in proportion to the total water content of the well, and permitting the water to circulate by convection to and from these fonts, and by effectively insulating both the container and the base portion of my poultry fountain against heat losses, I retard the freezing so that my fountain will still be effective after a quite cold night, which has not been found possible with the constructions heretofore in use. Hence I am able to accomplish this highly important object in a drinking fountain constructed of sheet metal, thereby avoiding the breakages encountered when earthenware or fragile materials are employed.

By forming the lower portions of the fonts 19 flush with the well bottom 16, I facilitate the flow of water to and from these fonts and cause any dirt in the fonts to be carried into the well, thereby keeping the water in the fonts relatively clear and clean when my fountain is in use. And by forming the fonts as quarter-spherical surfaces thus merging into the well, I facilitate the complete cleaning of the base member, which has its entire well and font interiors exposed (as shown in Fig. 3) when the container is lifted off the base member.

In practice, I desirably use so called balsam wool for the heat insulation. I also desirably provide four fountains in the well, thereby securing a sufficiently wide spacing of the fountain to permit simultaneously drinking by four chickens while reducing the exposed water area so that the general arrangement of my fountain will prevent a freezing.

However, I do not wish to be limited to these or other details of the construction and arrangement thus disclosed, since many changes might be made without departing either from the spirit of my invention or from the appended claims.

I claim as my invention:

1. A base member for a poultry fountain, comprising a shallow base part, an upper wall-forming part supported from the upper edge of the outer wall of the said base part and otherwise freely spaced from the latter part, and a filling of heat-insulating material between the said two parts, the said upper part being formed to afford a plurality of substantially quarter-spherical well extensions adjacent at their upper and outward edges to the upper edge of the outer wall of the said base part, and a generally cylindrical and relatively larger central well portion; each of the well extensions opening both upwardly, and radially inward of the base to the central well portion.

2. A poultry fountain comprising a hollow base having a heat-insulating packing between its wall, the top of the base being dished downwardly to afford fonts opening into a central well and extending close to the outer edge of the said top; a container having a downwardly directed neck socketed in and extending part way down into the said well and having a bottom outlet, the container having a flat top and having double walled top and side walls packed with heat-insulating material, the spacing between the two walls and the thickness of the heat-insulating material being less in the container top than in the side wall of the container; and a cap fitted upon the radially outer portion of the container top to afford an air space therebetween, the cap having a substantially conical upper surface formed with radial grooves to prevent chickens from roosting on it and being detachable from the container.

3. A poultry fountain comprising as manually separable members a hollow base having a cylindrical outer wall and having its top wall provided with depressions forming a central well and radial well extensions all disposed within the contour of the said wall, and a container having an outlet opening into the central well; the container having an annular shoulder seated on the said top wall of the base and extending radially beyond the central well and exposing considerable portions of the said well extensions; the said base and container having interengaging formations for centering the container on the base in its aforesaid position, the bottoms of both the central well and the well extension being spaced upwardly from the bottom wall of the base; and a filling of heat-insulating material between the bottom of the base and both the central well and the well extensions.

4. A poultry fountain as per claim 3, in which the heat insulating material also extends between the said outer wall of the base and all radially outward portions of the central well and the well extensions, and in which the said material reaches between the said extensions to undepressed portions of top wall of the base, so as to insulate all of the said well portions except the exposed mouths of the well extensions against direct loss of heat to the surrounding air and to a support for the said base.

5. A poultry fountain comprising a base member presenting a central well and radial well extensions, and a liquid container detachable from the base member and having its outlet opening into the central well; the container having spaced peripheral walls, the inner of which extends downwardly into the central well to center the container on the base member; the container also having an annular flange connecting the lower end of the outer peripheral wall with the inner peripheral wall, which flange is seated upon portions of the base member disposed between the well extensions, and having a filling of insulating material between the said walls.

6. A poultry fountain including a peripherally cylindrical hollow base member including spaced upper and lower walls and presenting an upwardly open central well having spaced inner riser wall portions forming parts of a common cylindrical surface and having well extensions connecting the said wall portions and extending radially of the base outwardly from the said cylindrical wall portions, and heat-insulating material filling the interior of the hollow base.

Signed at Macomb, Illinois, September 30th, 1929.

DONALD B. TOLLEY.